July 19, 1932.  A. McD. McAFEE  1,867,672
MANUFACTURE OF ALUMINUM CHLORIDE
Filed Sept. 30, 1927
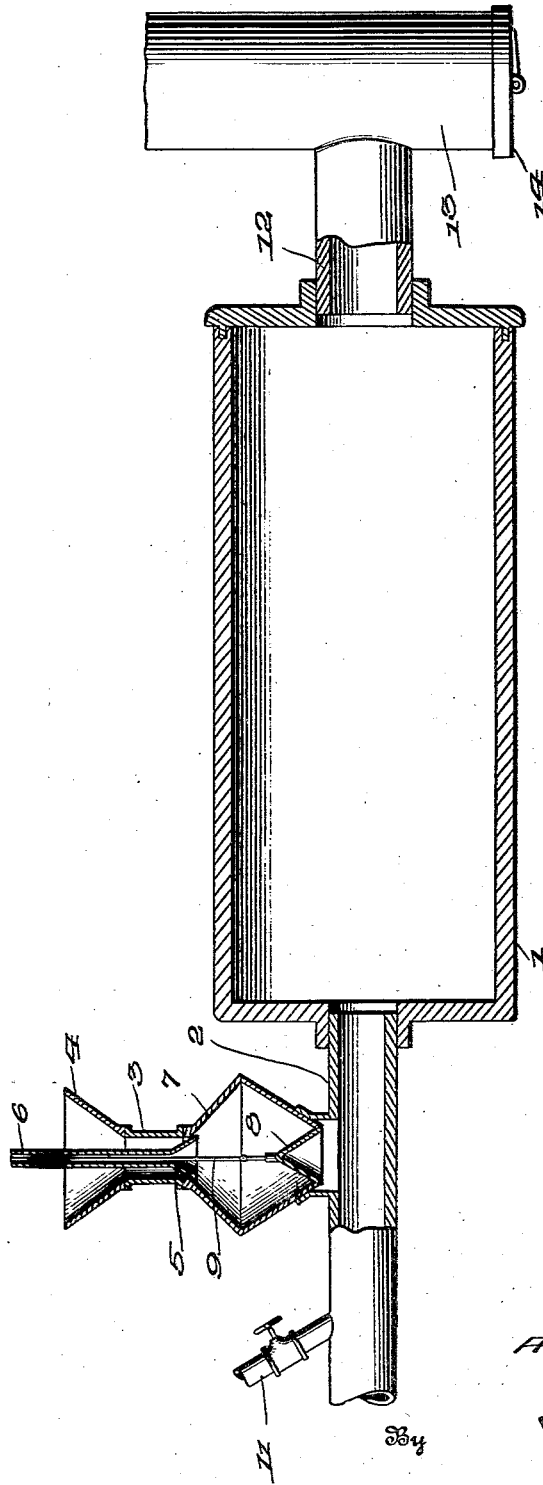
Inventor
A. M. McAFEE,
By K. P. McElroy
Attorney Patented July 19, 1932

1,867,672

UNITED STATES PATENT OFFICE

ALMER McDUFFIE McAFEE, OF PORT ARTHUR, TEXAS, ASSIGNOR TO GULF REFINING COMPANY, OF PITTSBURGH, PENNSYLVANIA, A CORPORATION OF TEXAS

MANUFACTURE OF ALUMINUM CHLORIDE

Application filed September 30, 1927. Serial No. 223,066.

This invention relates to the manufacture of aluminum chloride; and it comprises a process of making aluminum chloride wherein a fine grained mixture of alumina, such as bauxite, and carbon, such as oil coke, is projected in aerial suspension by a jet of chlorin containing enough admixed oxygen to cause a quick and energetic development of heat at the expense of some of the carbon, the projected materials forming what may be called a flame burning in free suspension with the solids and chlorin vanishing entirely therewithin; combustion and reaction being usually regulated by employing a small proportion of diluent gas with said oxygen; all as more fully hereinafter set forth and as claimed.

In the accepted method of making anhydrous aluminum chloride, hot carbon and alumina are subjected to the action of chlorin. The alumina is ordinarily employed in the form of bauxite. On mixing bauxite with carbon and subjecting it to the action of chlorin at a temperature of 1600° F., or higher, all the components are chlorinated, producing a mixture of chlorides in the vapor form; aluminum chloride being the major component. If the conditions of operation are correct, neither chlorin nor solid matter will remain. For efficient operation everything should be dry and free of hydrogen to prevent waste of chlorin as HCl and no more than a trace of free chlorin should remain with the vapors. The operation, however, in practice requires a considerable amount of heat to keep it going and it goes forward most smoothly at a temperature around 2000° F. Temperatures above 2800° F., and especially with impure bauxite, are sometimes disadvantageous because of clinkering or sintering retarding the actions.

All methods now in use however suffer from apparatus difficulties and are, moreover, relatively slow; it being difficult to gain high capacity without apparatus of inordinate size. Apparatus difficulties are inherent wherever hot carbon and chlorin come into contact with chamber walls of clay or the ordinary ceramic materials. Firebrick linings are shortlived.

In the prior art, propositions have been made to escape these difficulties with the walls of the reaction chambers by performing the whole reaction with the materials in aerial suspension. In principle this suggestion is sound but difficulties lie in its application. If, as has been proposed, the entire heat necessary is furnished by preheat of the chlorin, coke and bauxite, there is trouble in controlling condition so as to have neither bauxite nor chlorin pass forward unutilized; and moreover preheating chlorin is not a convenient operation. If a certain amount of air is mixed with the projected solids and chlorin, there is the production of a flame and heat is supplied for reaction within the flame itself; but the difficulty is found of slow and irregular action. The time afforded for reaction within the flame is not sufficient to give complete utilization of the chlorin and bauxite; this being probably due to mechanical hindrance by the diluting nitrogen of the air. Air consists of 21 per cent oxygen and 79 per cent nitrogen (and argon). If the air be replaced by the corresponding amount of oxygen as such the action becomes too violent and the flame too short to afford the necessary time for reaction. With pure oxygen localized high temperatures develop and the bauxite (and particularly impure grades containing much silica and iron) may sinter or agglomerate and lose its fine grained form.

I have found that the actions may be so controlled as to give a projected flame of convenient length with complete, or substantially complete utilization of the bauxite and of the chlorin, if the oxygen used be diluted with some nitrogen; the amount of nitrogen however being less than that normal to air. A small amount of diluting nitrogen regulates the deveolpment of heat without slowing it down unduly. I do not desire to have a ratio of nitrogen to oxygen more than 50:50, and in practice sometimes a ratio of 20:80 is considerably better. Very frequently I use a mixture of equal volumes of air and of oxygen which gives me a nitrogen : oxygen ratio of 40:60 and this works very well.

Using the oxygen diluted with nitrogen within the ranges mentioned I have found that complete utilization of chlorin and of oxygen may be attained with a high speed reaction giving great capacity in the apparatus. Since all actions take place in suspension, the walls of the apparatus may be cooled and the life of linings prolonged indefinitely. At 1400° or 1500° F. the conjoint action of chlorin and carbon on firebrick is slow and at lower temperatures it disappears. With undiluted oxygen higher temperatures and quicker reactions are obtained but ordinarily in a flame of bauxite and carbon burning in a jet of chlorine mixed with pure oxygen to give aluminum chloride and oxides of carbon, the temperatures are locally too high and the action of the gases too rapid to permit complete utilization of the bauxite, especially if sintering occurs. There is apt to be a loss of bauxite as incompletely consumed granules, no matter how fine the bauxite is ground. Unconsumed bauxite goes forward as a dust; sometimes of almost fume fineness. The finer the bauxite is ground, the less difficulty there is in the use of pure oxygen and with bauxite ground extremely fine, the use of pure oxygen is worth while, since it gives enormous capacity for a given size of apparatus.

Ordinarily, however, as stated, I find it better to dilute the oxygen somewhat with nitrogen, as the grinding of the bauxite thereby becomes more economical. It is not necessary to grind to such extreme fineness as with pure oxygen. In using bauxite of an ordinary degree of fineness, say, so that 70 or 80 per cent will go through a 100 mesh sieve, and with coke of corresponding fineness, it is in general advisable to use the oxygen:nitrogen ratios stated.

With such a mixture of oxygen and nitrogen, admixed with chlorin to form a compound jet, this jet projecting a mixture of hot bauxite and hot carbon into a reaction chamber, a true flame may be obtained in which bauxite and chlorin completely disappear; so that a maximum utilization of both is obtained. The products of combustion leaving the flame are a clean mixture of the vapors of aluminum chloride carrying some silicon chloride, iron chloride and titanium chloride with CO and $CO_2$. I ordinarily adjust the amount of oxygen relative to the carbon, chlorin and bauxite, so as to obtain about equal volumes of CO and $CO_2$. Generally, I use oxygen and chlorin in a volume ratio of about 1:3.3. Advantageous ratios for the oxygen, chlorin and nitrogen are therefore about 20:67:13 parts by volume.

I regard nitrogen as the best diluent for the oxygen in the present invention, but other inert gases may be used in its lieu. For example, products of combustion or the tail gases coming from the condensers used for condensing the aluminum chloride may be employed. In using either products of combustion or these tail gases, the proportion should be less than where nitrogen itself is used, since the contained $CO_2$ exhibits a specific chemical cooling action. In using products of combustion or tail gases, they should be as free of $H_2O$ or hydrogen as possible.

In producing a mixture of oxygen diluted with nitrogen, either air or nitrogen itself can be used for admixture with the oxygen. The important point is the ratio between $O_2$ and $N_2$ and the source is less important. In this connection, however, it may be noted that where air is used, it is best to dry it first and particularly in wet climates. Oxygen delivered from an air liquefying plant, the usual commercial source, is absolutely dry. Such a plant also delivers absolutely dry nitrogen and this nitrogen is convenient for use in the present process. Unlike air, it requires no drying.

I regard the present invention as covering high speed production of anhydrous aluminum chloride from bauxite or other form of alumina and carbon (advantageously oil coke) burning in aerial suspension in a mixture of chlorin and somewhat diluted oxygen, the dilution being such as to give the necessary time factor for the consumption of bauxite granules in convenient size without lowering the temperature too much. The function of the diluent gas is, so to speak, that of lengthening the flame. I use the term "aerial suspension" as a convenient one, although the suspension of the flame is actually in an atmosphere of a mixture of vapors of aluminum chloride and carbon oxids. The bauxite and the coke should be heated to free them of moisture and volatiles; and it is desirable to deliver the mixture to the reaction zone at a high temperature; say, 1100° F. At this temperature the carbon ignites at once and the development of flame is normal.

In the accompanying drawing I have shown one form of apparatus useful in the performance of my process. The view is a section through the apparatus, certain parts being shown in elevation. The reaction chamber may be used in either a vertical or a horizontal position. As shown, it is horizontal. The reaction chamber 1 of tile, brick or other heat resisting material is provided at one end with an inlet 2 to which is connected a feeding device 3 consisting of a main hopper 4, bell 5, bell operating sleeve 6, supplemental or storage hopper 7, bell 8 and bell operating arm 9. A mixture of aluminous material and carbon, (such as bauxite and oil coke) is supplied from the main hopper 4 to the supplemental hopper 7 and continuously fed from the latter into the stream of gases going through feed pipe 2 past the bell 8. The metal of the bell 8 is protected by means of a coating of clay or the like, or the bell may be made entirely of ceramic material properly reinforced. A mixture of chlorin and oxygen in the proportion stated is admitted to the inlet 2 and diluent gas, which may be nitrogen, $CO_2$, or tail gases of the operation itself, is admitted through the valved inlet 11.

At the other end, the reaction chamber is provided with an outlet 12 connecting with the trap 13 having a removable door 14 for removing from time to time any settled dust which may pass the reaction chamber and the trap 13 is open at the top and is in communication with an aluminum chloride condenser (not shown).

In a specific embodiment of my invention bauxite and petroleum coke are ground so that 70 or 80 per cent will pass a hundred mesh sieve and are fed continuously as a hot admixture by means of the hopper arrangement described to the inlet 2 while a mixture of oxygen and chlorin in the ratio of 1:3.3 is forced under pressure through the inlet 2. At the same time nitrogen or air is fed to the inlet by means of pipe 11 to give a ratio of 40 parts nitrogen to 60 of oxygen. This makes a compound jet and is projected into the reaction chamber carrying the freely reacting bauxite and coke with it, forming what is virtually a flame. Within this flame, using the proportions specified there is given the necessary time factor for complete consumption of the bauxite and complete utilization of chlorin where bauxite and chlorin are properly proportioned.

As stated instead of using nitrogen some carbon dioxid may be used or the waste gases from the aluminum chloride condenser may be returned and admitted through the pipe 11.

The bauxite and coke are supplied from a retort or oven in which they have been heated to a temperature sufficient to drive out all moisture and volatiles. They are then delivered to the reaction chamber at usually not less than 1100° F. With the bauxite and coke at such a temperature ignition is instantaneous when the oxygen and chlorin come in contact with the mixed solids.

The example given is illustrative of one way of performing the process. The function of the oxygen in the flame is of course to develop heat at the expense of some of the carbon. As stated, however, the action of oxygen itself is apt to be local and violent with production of a short flame and incomplete reaction unless great care be exercised in grinding and in the rest of the operation. With the oxygen somewhat diluted within the limits specified, the whole action becomes quite regular. In starting with the apparatus cold it is commonly necessary to use the oxygen somewhat stronger than in the later stages of operation after reaction chamber 1 is hot. And sometimes for one reason or another it is necessary to vary the oxygen supply slightly one way or another during operation. Most of the variations however are within the limits mentioned ante. I find that by using a mixture of nitrogen and oxygen with a sub-atmospheric nitrogen content I can combine the advantages of regular action with complete control of the operation.

What I claim is:—

1. In the manufacture of aluminum chloride, the process which comprises projecting a burning fine grained mixture of carbon and bauxite by a jet of chlorin containing some oxygen, the said oxygen being accompanied by some nitrogen but not in amount greater than its own volume.

2. In the manufacture of aluminum chloride, the process which comprises projecting a fine grained hot mixture of aluminous material and carbon by a jet of chlorin admixed with sufficient oxygen to establish and maintain a temperature in the jet around 2000° F. said oxygen containing just enough nitrogen to prevent irregular and violent action; said nitrogen not being present in greater volume than the oxygen.

3. In the manufacture of aluminum chloride, the process which comprises projecting a burning fine grained mixture of aluminous material and carbon by a jet of chlorin containing some oxygen and some nitrogen, the proportion of nitrogen to oxygen being in about the ratio 40:60.

4. In the manufacture of aluminum chloride, the process which comprises burning a jet of finely divided aluminous and carbonaceous material in an atmosphere of gases comprising oxygen, chlorin and nitrogen, the said gases being in the approximate ratios by volume of 20:67:13.

5. In the manufacture of aluminum chloride, the process which comprises burning a jet of mixed aluminous and carbonaceous material, of a fineness such that 70 to 80 per cent passes a 100 mesh sieve, in an atmosphere containing chlorin, oxygen and nitrogen; the oxygen:nitrogen ratio of the said atmosphere being between 50:50 and 80:20.

In testimony whereof, I have hereunto affixed my signature.

ALMER McDUFFIE McAFEE.